United States

Kakeda

[11] 3,966,304

[51] June 29, 1976

[54] LIQUID CRYSTAL DISPLAY DEVICE

[75] Inventor: Teruyuki Kakeda, Tokyo, Japan

[73] Assignee: Asahi Kogaku Kogyo Kabushiki Kaisha, Japan

[22] Filed: Aug. 14, 1974

[21] Appl. No.: 497,266

[30] Foreign Application Priority Data
Aug. 20, 1973 Japan............................ 48-97396[U]

[52] U.S. Cl. .......................................... 350/160 LC
[51] Int. Cl.² .......................................... G02F 1/13
[58] Field of Search .............................. 350/160 LC

[56] References Cited
UNITED STATES PATENTS

| | | |
|---|---|---|
| 3,731,986 | 5/1973 | Fergason .................. 350/160 LC X |
| 3,843,230 | 10/1974 | Haas et al. ................. 350/160 LC X |

Primary Examiner—John K. Corbin
Assistant Examiner—Matthew W. Koren
Attorney, Agent, or Firm—Christie, Parker & Hale

[57] ABSTRACT

A liquid crystal display device, useful for selectively displaying numbers or other symbols in accordance with an electrical control potential applied across two electrode surfaces in the device, is constructed in such a way as to eliminate the need for etching the symbol.

10 Claims, 4 Drawing Figures

LIQUID CRYSTAL DISPLAY DEVICE

BACKGROUND OF THE INVENTION

This invention relates to a liquid crystal display device for displaying numbers, letters, or like symbols.

It is already known that a preselected pattern can be displayed by liquid crystal display devices that use the light scattering phenomenon or optically anisotropic property of a liquid crystal. In such liquid crystal display devices, however, it has been the practice to etch the transparent electrode or metallic film of the devices.

SUMMARY OF THE INVENTION

In accordance with this invention, there is no need to etch electrodes in order to provide for pattern or symbol display.

A display device of this invention is broadly characterized in that a liquid crystal is held within a cell that imparts to the liquid crystal molecules orientations which vary locally in accordance with a preselected pattern to be displayed. Preferably, the cell comprises spaced-apart multi-layered side walls at least one of which is transparent. In a specific embodiment, such layers include a transparent outer base plate, a transparent intermediate electrode layer, and an interior film of polyvinyl alcohol. Different selected portions of the film have different selected orientations for the long axes of the molecules thereof, with one of the portions defining the pre-selected pattern. The film abuts a surface of the liquid crystal as one wall of the cell and imparts to the liquid crystal correspondingly selected orientations of the long axes of the molecules.

In place of polyvinyl alcohol, the interior film may be composed of thin layer forming various high molecular compounds. Examples of the compound, which serve for exhibiting substantially similar effect as that effected by the interior film of polyvinyl alcohol, are acrylic resins such as polymethyl methacrylate, and photosensitive resins essentially including polyvinyl cinnamate or a rubber of polyisoprene system.

As to the thickness of the interior film, there is no particular limitation except that the same is thin enough to be selectively oriented in one direction by a simple rubbing operation. Preferable thickness of the interior film ranges within the order of microns or ten microns, most preferably about 5 to 10 microns.

In terms of method, the present invention is an improvement in fabrication. Distinguishing steps thereof include supporting a film of polyvinyl alcohol, imparting different selected orientations to the long axes of the molecules of respective selected portions of the polyvinyl alcohol film, and abutting the supported film against the surface of the liquid crystal to form one wall of a cell therefor. Preferably, the film is rubber with cotton or the like so as to impart the long-axes-orientation thereto. A mask having a suitable cutout to define the pattern is advantageously used in connection with the step of imparting different selected orientations.

DETAILED DESCRIPTION

Figure 1:
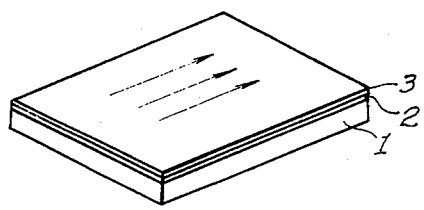
FIGS. 1 and 2 are perspective views, each showing separately the preferred construction of a respective wall of a liquid crystal cell according to the invention, and FIG. 2 in addition illustrates a mask used in the improved method of fabrication according to this invention.
Figure 3:
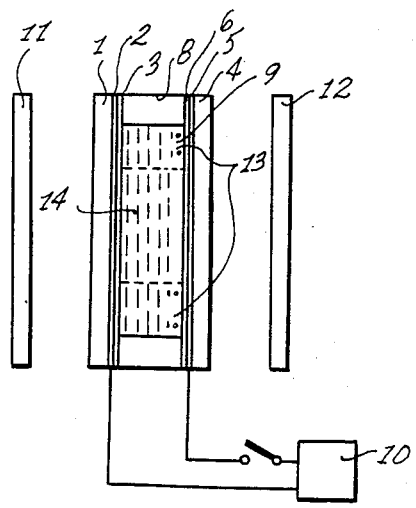
FIG. 3 is a schematic view of a liquid crystal display arrangement according to a preferred embodiment of this invention.

Referring first to FIG. 1, indicated at 1 is a transparent base plate made of glass, for example, at 2 is a transparent electrode layer and at 3 is a thin film of polyvinyl alcohol adhered to said transparent electrode layer 2 for aligning the liquid crystal molecules with their long axes remaining parallel to the direction of said transparent base plate 1. As indicated in FIG. 3, these, three layers are used as one wall or electrode assembly of a cell within which is held a liquid crystal. Prior to assembly of the cell, the film 3 is treated as for example by rubbing it with cotton or the like in the direction of arrows so that the long axes of liquid crystal molecules of the film are oriented in the rubbing direction parallel to each other.

Figure 2:
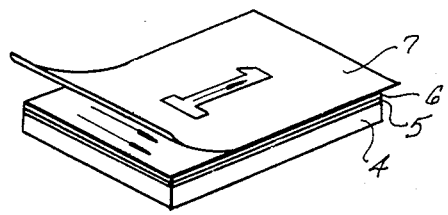

Referring now to FIG. 2, indicated at 4, 5 and 6 are a transparent base plate, transparent electrode layer and thin film of polyvinyl alcohol, respectively. To prepare this electrode assembly, the thin film 6 of polyvinyl alcohol is first rubbed in a direction at right angles to the rubbing direction of FIG. 1. A thin mask 7 which has been cut out in a preselected pattern is then placed on top of said polyvinyl alcohol thin film 6 and rubbed over the entire surface area thereof excepting the cutout portion in a direction at right angles to the direction in which the polyvinyl alcohol thin film 6 has been rubbed, and then the mask 7 is removed.

Illustrated in FIG. 3 is a liquid crystal display device obtained by using the electrode assemblies of FIGS. 1 and 2. The drawing indicates at 8 a spacer, at 9 a nematic liquid crystal having a positive dielectric anisotropy, at 10 a control circuit connected to the transparent electrodes 2 and 5, at 11 a polarizer and at 12 an analyzer. The liquid crystal molecules in this liquid crystal cell are so oriented that the long axes thereof are, in the area 13 excluding the preselected pattern, parallel to the electrode assemblies and at right angles to each other and, in the area 14 of the preselected pattern to be displayed, are parallel to the electrode assemblies. In the area 13 the distorted nematic liquid crystal has an optical rotatory power just like a cholesteric liquid crystal and, when it is distored for 90°, the linearly polarized incident light will pass through the liquid crystal cell, rotating the plane of polarization for 90°. In the area 14 where the long axes of liquid crystal molecules extend parallel to the electrode assemblies, the nematic liquid crystal provides no optical rotatory power so that the linearly polarized incident light passes through the cell without being rotated. Under the conditions where the polarizer 11 and analyzer 12 are arranged at right angles to each other, then the area 13 other than the preselected pattern will form a bright area, while the pattern area 14 will form a dark area. On the other hand, if the polarizer 11 and analyzer 12 are arranged parallel to each other, then the area 13 other than the preselected pattern will form a dark area, while the pattern area 14 will form a bright area. Accordingly, a transparent pattern on a black background or a black pattern on a transparent background can be obtained from a single common liquid crystal cell simply by varying the relative angular positions of the polarizer 11 and analyzer 12.

Figure 4:
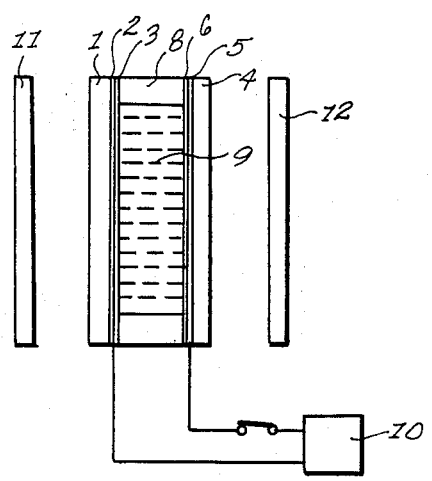
FIG. 4 is a view similar to FIG. 3 in which there is illustrated the condition where an electric field is applied to the liquid crystal display device.

FIG. 4 shows the liquid crystal display device of this invention in a condition where the action of an electric field is being applied to the liquid crystal cell by means of the control circuit 10. Under these circumstances, the positive dielectrically anisotropic nematic liquid crystal is oriented parallel to the direction of electric field, and in both the areas 13 and 14, the liquid crystal is oriented in a direction perpendicular to the electrode assemblies so that the entire liquid crystal cell becomes optically isotropic, making the pattern disappear. This is a nondestructive change and, when the electric field is switched off, the liquid crystal molecules will restore to their original orientation, making the preselected pattern visible again.

The exemplary method for manufacturing the cell used in the device of this invention will now be described in detail hereinbelow.

Two transparent base plates 1 and 4 made of glass are prepared and transparent electrode layers 2 and 5 are applied over one surface thereof, respectively, by vacuum evaporation coating of, for example, indium oxide or tin oxide. An aqueous solution of polyvinyl alcohol, which is prepared by dissolving 5 to 10%, by weight, of polyvinyl alcohol in water, is sprayed on the surface of the transparent electrode layers 2 and 5 while supporting the plates on a carriage such as a rotating disc of a spinner to form interior films 3 and 6 of uniform thickness. Water is evaporated off by heating the thusly prepared electrode assemblies, for example, at about 80° to 100°C.

A cell, the sectional view of which is shown in FIGS. 3 and 4, is constructed by using the electrode assemblies of FIGS. 1 and 2, two pieces of spacer 8, and appropriate side plates (not shown). A nematic liquid crystal 9 is then poured into the cell through the pouring port thereof, and thereafter the cell is helmetically sealed by a conventional manner.

It will be apparent from the foregoing that with the liquid crystal display device of this invention a preselected pattern can be displayed very easily without etching the electrode surface.

What is claimed is:

1. A liquid crystal display device comprising a liquid crystal contained in a cell comprising transparent, opposed, spaced-apart, parallel, multi-layered side walls, wherein the side walls comprise:
   a. a transparent outer base plate;
   b. a transparent intermediate electrode layer; and
   c. a transparent interior polymeric film in abutting relationship to a surface of the liquid crystal, the long axes of the constituent molecules of selected portions of the transparent interior polymeric film having select orientations different from the orientations of the molecules of the remainder of the transparent interior polymeric film, the long axes of the molecules in the liquid crystal having orientations corresponding to the orientations of the constituent molecules of the interior film.

2. The device as claimed in claim 1 wherein the liquid crystal is nematic and has positive dielectric anisotropy.

3. A device as claimed in claim 1 wherein the interior polymeric film comprises a material selected from the group consisting of polyisoprene and polyvinyl cinnamate.

4. A liquid crystal display device comprising a liquid crystal contained in a cell comprising transparent, opposed, spaced-apart, parallel, multi-layered side walls wherein the side walls comprise:
   a. a transparent outer base plate;
   b. a transparent intermediate electrode layer; and
   c. a transparent interior film of a material selected from the group consisting of polyvinyl alcohol, acrylic polymers, polyvinyl cinnamate, and polyisoprene in abutting relationship to a surface of the liquid crystal, the long axes of the constituent molecules of selected portions of the transparent interior film having select orientations different from the orientations of the molecules of the remainder of the transparent interior film, the long axes of the molecules in the liquid crystal having orientations corresponding to the orientations of the constituent molecules of the interior film.

5. The device as claimed in claim 4 wherein the liquid crystal is nematic and has positive dielectric anisotropy.

6. In a method for fabricating a display device of the type in which a liquid crystal is held within a cell, the improvement which comprises the steps of:
   supporting a transparent polymeric film on a transparent electrode layer;
   imparting by rubbing different selected orientations to the long axes of the molecules of respective selected portions of the film, one of said portions defining a pattern to be displayed in use of the fabricated display device; and
   abutting the supported film against the surface of the liquid crystal, wherein said film forms one wall of the cell and said film imparts different selected orientations to the long axes of the molecules in the liquid crystal corresponding to the different orientations imparted to the long axes of the molecules of the film.

7. A method as claimed in claim 6 wherein the liquid crystal is nematic and has positive dielectric anisotropy.

8. A method as claimed in claim 6 wherein the transparent polymeric film comprises a material selected from the group consisting of polyisoprene and polyvinyl cinnamate.

9. In a method for fabricating a display device of the type in which a liquid crystal is held within a cell, the improvement which comprises the steps of:
   supporting a transparent film of a material selected from the group consisting of polyvinyl alcohol, acrylic polymers, polyvinyl cinnamate and polyisoprene on a transparent electrode layer;
   imparting by rubbing different selected orientations to the long axes of the molecules of respective selected portions of the film, one of said portions defining a pattern to be displayed in use of the fabricated display device; and
   abutting the supported film against the surface of the liquid crystal, wherein said film forms one wall of the cell and said film imparts different selected orientations to the long axes of the molecules in the liquid crystal corresponding to the different orientations imparted to the long axes of the molecules of the film.

10. A method as claimed in claim 9 wherein the liquid crystal is nematic and has positive dielectric anisotropy.

* * * * *